US008056248B2

(12) United States Patent
Hatala

(10) Patent No.: US 8,056,248 B2
(45) Date of Patent: Nov. 15, 2011

(54) DIGIT LEVEL DEVICES AND METHODS

(76) Inventor: Sharon Mario Hatala, Folsom, PA (US)

( * ) Notice: Subject to any disclaimer, the term of this patent is extended or adjusted under 35 U.S.C. 154(b) by 494 days.

(21) Appl. No.: 12/192,989

(22) Filed: Aug. 15, 2008

(65) Prior Publication Data

US 2009/0044821 A1 Feb. 19, 2009

Related U.S. Application Data

(60) Provisional application No. 60/964,900, filed on Aug. 15, 2007.

(51) Int. Cl.
*G01C 9/26* (2006.01)
(52) U.S. Cl. .............................. 33/370; 33/347
(58) Field of Classification Search .................. 33/347,
33/365, 370, 371, 372, 373, 379
See application file for complete search history.

(56) References Cited

U.S. PATENT DOCUMENTS

| | | | | |
|---|---|---|---|---|
| 967,258 A * | 8/1910 | Stamm | .......................... | 33/373 |
| 2,901,836 A * | 9/1959 | Hall | ................................ | 33/373 |
| 3,188,748 A * | 6/1965 | Moody | ........................... | 33/373 |
| 3,269,729 A * | 8/1966 | Morrison | ...................... | 33/373 |
| 3,301,559 A * | 1/1967 | Jolley | ............................. | 33/373 |
| 3,484,943 A * | 12/1969 | Yarbrough | ..................... | 33/370 |
| 3,673,696 A * | 7/1972 | Wasson | .......................... | 33/370 |
| 4,220,402 A * | 9/1980 | Jannelli | .......................... | 33/200 |
| 4,383,374 A * | 5/1983 | Bertero | ........................... | 33/373 |
| 4,785,544 A * | 11/1988 | Heinsius et al. | ................ | 33/372 |
| 5,398,422 A * | 3/1995 | Clarkson | ......................... | 33/365 |
| 5,505,001 A * | 4/1996 | Schaver, Jr. | .................... | 33/371 |
| 7,578,070 B1 * | 8/2009 | Lynch | ........................... | 33/514.1 |
| 2007/0256699 A1 | 11/2007 | Veras et al. | | |

OTHER PUBLICATIONS

Website: http://www.individualicons.com/store/cart.php?m=product_list&c=5.

* cited by examiner

*Primary Examiner* — G. Bradley Bennett
(74) *Attorney, Agent, or Firm* — Patricia A. Wenger

(57) ABSTRACT

A digit level device that is attachable with a digit and that includes a spirit level with a length that is longer than it is wide that measures the relative vertical and horizontal angle of the length of a finger of thumb. A digit level device that includes a level that is configured to be attachable with at least one of the distal phalanx section or the middle phalanx section of at least one digit of the user. A digit level device that includes at least one laser level or digital level that is configured to attach to at least one finger of a user. A method for cutting hair. The method includes attaching a digit level device to a digit, and using the level to determine the angle of the cut in relation to the horizontal and vertical plane.

20 Claims, 13 Drawing Sheets

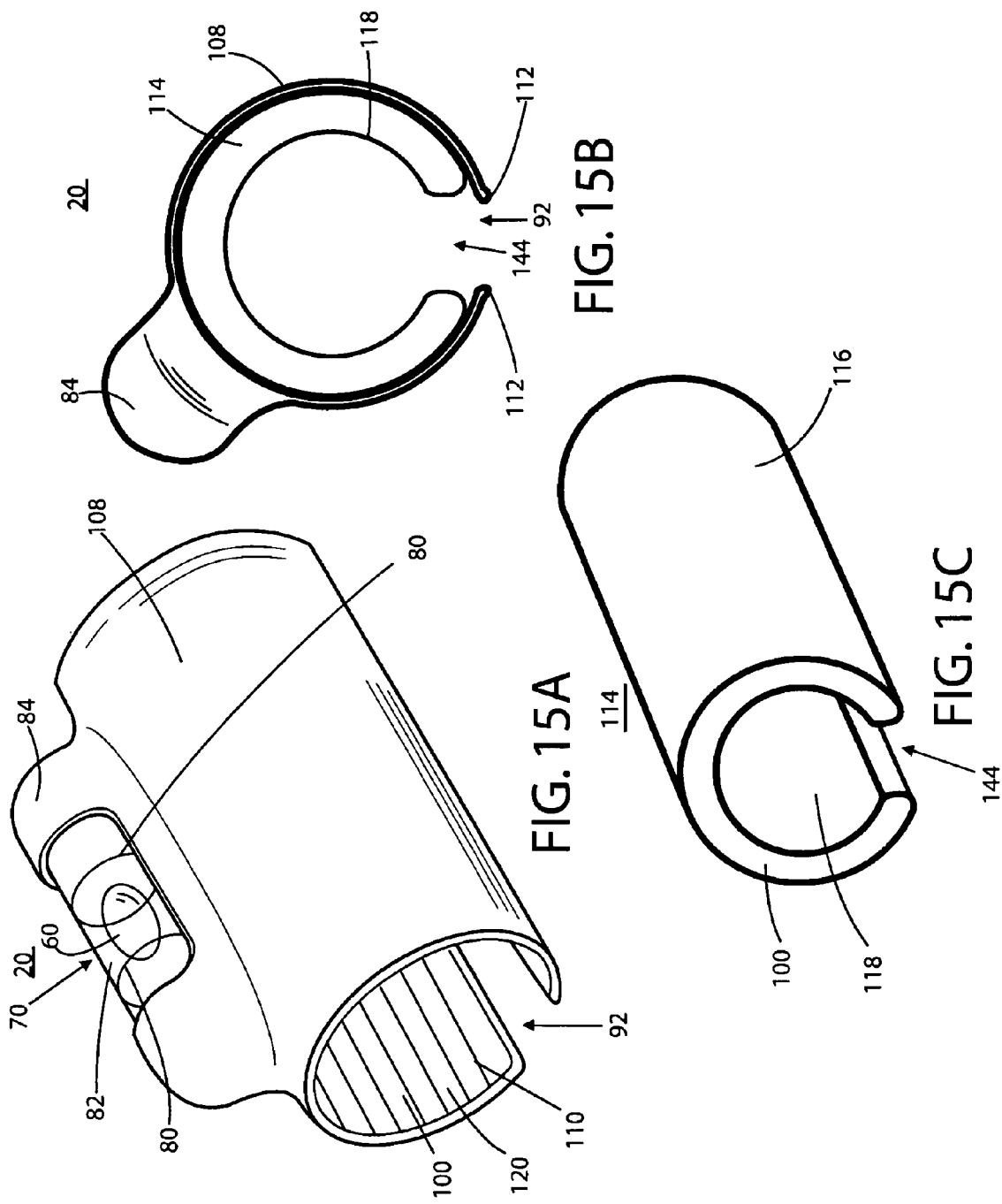

DIGIT LEVEL DEVICES AND METHODS

REFERENCE TO RELATED APPLICATION

This application claims the benefit of provisional application filed by Sharon Marie Hatala, on Aug. 15, 2007, Application No. 60/964,900, entitled: "Finger apparatus with bubble type level."

FIELD OF THE INVENTION

The invention includes but is not limited to digit level devices and methods.

SUMMARY OF THE INVENTION

The invention includes, but is not limited the follow:

A digit level device that includes a spirit level. The spirit level has a length that is longer than it is wide. The device further includes at least one digit attacher, which is attachable with at least one digit of a user, whereby the level is oriented with the digit such that when the digit attacher is attached with at least one digit of a user, the length of the spirit level is generally parallel with the length of the at least one digit.

A digit level device that includes a level that is configured to be attachable with at least one of the distal phalanx or the middle phalanx of at least one digit of the user.

A digit level device that includes at least one laser level or digital level that is configured to attach to at least one finger of a user.

A method for cutting hair. The method includes providing a digit level device, attaching the digit level device to at least one digit of a user, and utilizing said leveling device while cutting hair to determine the angle of the cut. The angle of the cut can be determined in relation to the horizontal and vertical plane. In addition, the method can further include cutting the hair in alignment with at least one digit to which the leveling device attached. The method can similarly be used to determine the angle of matter near the digit with which the level is attached. This can be used to pin fabric.

BRIEF DESCRIPTION OF THE DRAWINGS

FIG. 15A is a perspective view of a digit level device;
FIG. 15B is an end view of the digit level device of 15A with an insert inserted;
FIG. 15C is a perspective view of the insert of FIG. 15B shown removed from the digit level device.

DETAILED DESCRIPTION OF EMBODIMENTS OF THE INVENTION

Figures 1A, 1B:
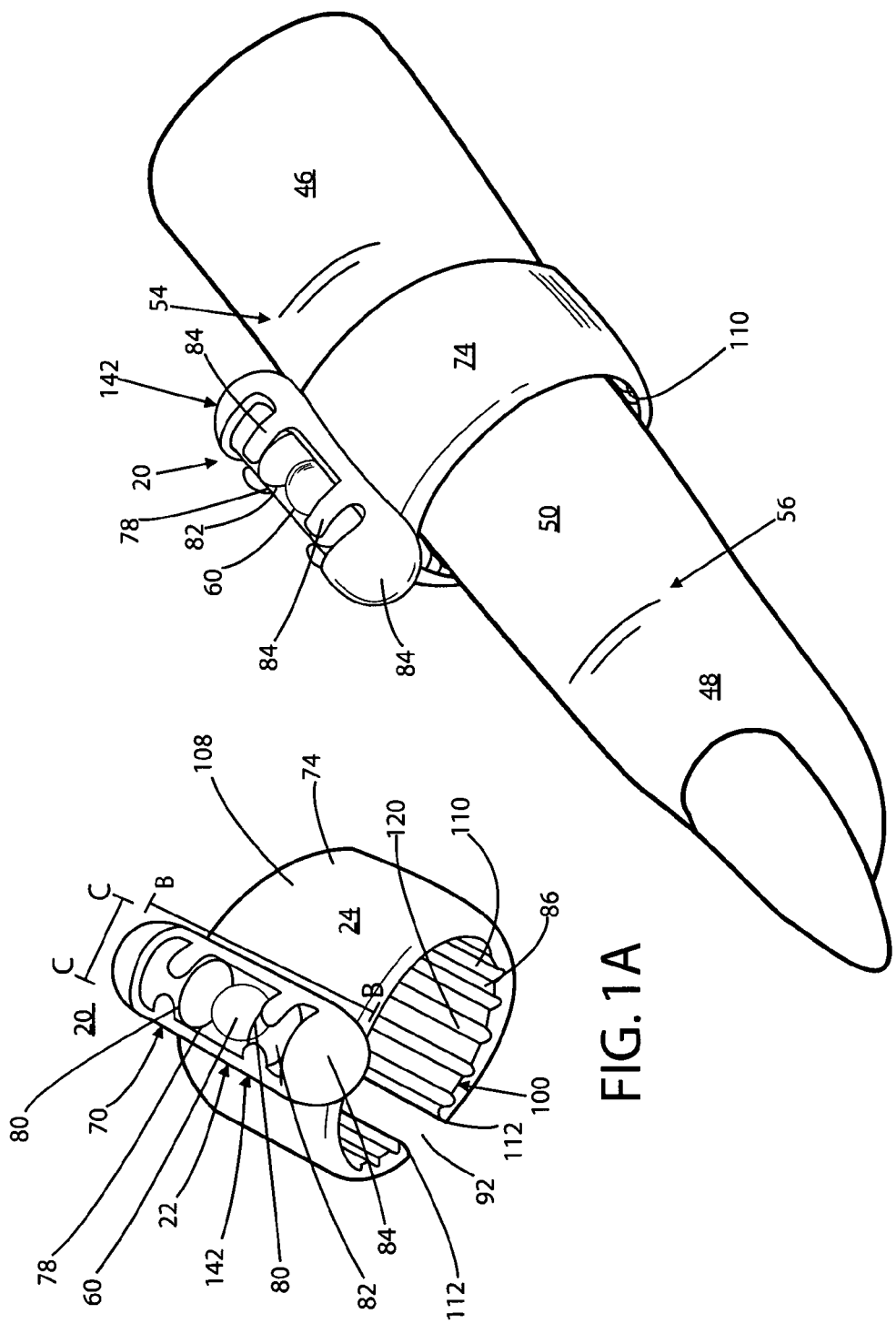
FIG. 1A is a view of a digit level device.
FIG. 1B is a view of the digit level device of FIG. 1 on a digit.

The invention includes embodiments of digit level devices 20 that include at least one level 22 that is attachable to at least one finger 32 or thumb 42 of a user such that the level will indicate the relative vertical and horizontal orientation of the length of at least one finger or thumb 42. As further explained in more detail herein, the embodiments of the device 20 may be useful for a variety of purposes by the user when the relative vertical and horizontal orientation of the length of at least one finger 32 or thumb 42 of the user is known. The invention can be helpful to users who want to determine and/or confirm that the length of at least one digit 30 is perfectly horizontal, perfectly vertical and/or at an angle in between. In addition, the invention includes embodiments of methods that utilize devices 20 to determine at least the relative horizontal and vertical orientation of matter 26 in the vicinity of the at least one digit 30 of a user, which can be useful for a number of purposes, including, but not limited to, to cut hair 44, to pin matter 26 and to cut matter 26.

Figure 2:
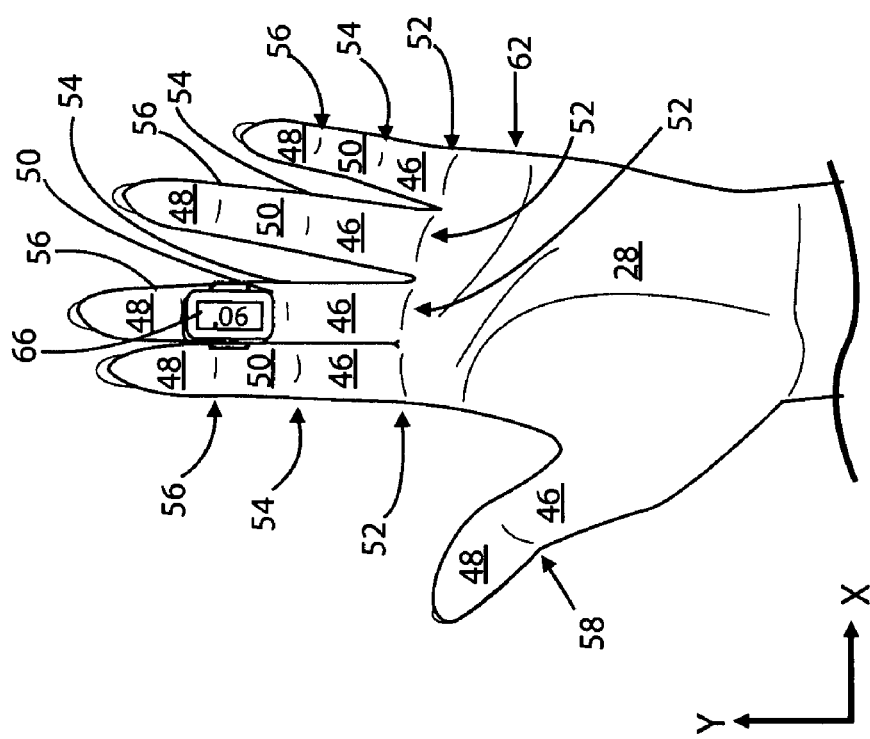
FIG. 2 is a view of palm side of a hand with a digit level device.

Definitions:

"Length of a digit", "length of the digit" of "length of the digits 3": Referring now to FIG. 2, as well known in the art, a typical hand 28 has five digits 30, which are four fingers 32 and a thumb 42. Also as well known in the art, usually each digit is longer a-a than it is wide d-d. As used herein, the longer dimension a-a of the digit 30 is referred to as the "length of a digit", "length of the digit" of "length of the digits 30".

"Relative horizontal and vertical": as well known in the art, horizontal is a plane that is generally perpendicular to the gradient of the gravity field, and vertical is a plane that is generally aligned with the force of gravity, and perpendicular to the horizontal plane. The term "relative horizontal and vertical" as used herein is intended to mean the angle in relation to horizontal and vertical. For example, and without intending to be limiting, an angle that is 30 degrees from horizontal also could also be referred to as being 60 degrees from vertical.

"Proximal phalanx section 46", "middle phalanx section 50", "distal phalanx section 48": Referring to FIG. 2, as is well known in the art, a typical human hand 28 has five digits 30, four of which are fingers 32, being the index finger 40, middle finger 38, ring finger 36 and pinky 34, and one of which is the thumb 42. Each finger has three bones called the proximal phalanx, the middle phalanx and the distal phalanx. The thumb 42 has a proximal phalanx bone and the distal phalanx bone. As used herein, the terms "proximal phalanx section 46", "middle phalanx section 50" and "distal phalanx section 48" refer to the portions of the digits 30 having the respective proximal phalanx, middle phalanx and/or distal phalanx bone.

In addition, each finger also has three joints. The first joint, where the finger joins the rest of the hand 28, is called the proximal phalanx joint 52. The second joint is the proximal interphalangeal joint 45 (referred to as the "PIP" joint.) The last joint of the finger, which is closest to the finger nail, is called the distal interphalangeal joint (referred to as the "DIP" joint 56.) On the thumb 42, and the metacarpalphalangeal joint 58 is in-between the proximal phalanx and the distal phalanx.

"Bulls-eye Exclusion": As well known in the art, the bulls-eye spirit level 72 contains a bubble 60 in a circular environment 88 containing a bulls-eye (not shown), and the bubble 60 will be in the bulls-eye when the circular environment 88 is horizontal from front to back and from side to side. Digit levels that include only one bulls-eye spirit level 72 on a band 74 that is not specifically configured to refrain from rotating around the digit 30 and/or to be attached with the distal phalanx section 48 and/or the middle phalanx section 50 of a digit such that it will not migrate to the proximal phalanx section 46 of the digit are not intended to be included in this invention; this is referred-to herein as the "Bulls-eye Exclusion".

As further explained in more detail herein, being able to readily ascertain the relative vertical and horizontal orientation of the length at least one digit 30 of the user has beneficial uses including to determine at least the relative horizontal and vertical orientation of matter 26 in the vicinity of the at least one digit 30 of a user. Readily being able to ascertain the relative vertical and horizontal orientation of the length at least one digit 30 of the user has beneficial uses including, but not limiting to, to cut hair 44, to pin matter 26, including but not limited to clothing hems, and to cut matter 26. In addition, as illustrated in FIGS. 7-10 and 18A-F, being able to readily ascertain the relative vertical and horizontal orientation of the length at least one digit of the user enables the user to place matter 26, such as but not limited to hair 44, in between two fingers 32, or a finger 32 and the thumb 42 and to be able to ascertain the relative vertical and horizontal orientation of the length of the at least one finger 32 and/or thumb 42 and therefore also the matter 26 that is located between the at least one finger and/or thumb 42. In addition, as the human fingers 32 and/or thumb 42 can be manipulated in a wide variety of ways to perform a wide variety of tasks, the ability of the user to readily ascertain the relative vertical and horizontal orientation of the length at least one digit 30 of the user can be useful to determine at least the relative horizontal and vertical orientation of matter 26 in the vicinity of the at least one finger 32 and/or thumb 42, and/or using the finger 32, fingers 32, thumb 42 and/or thumbs 42 on which the at least one digit level device 20 is located.

Figure 3:
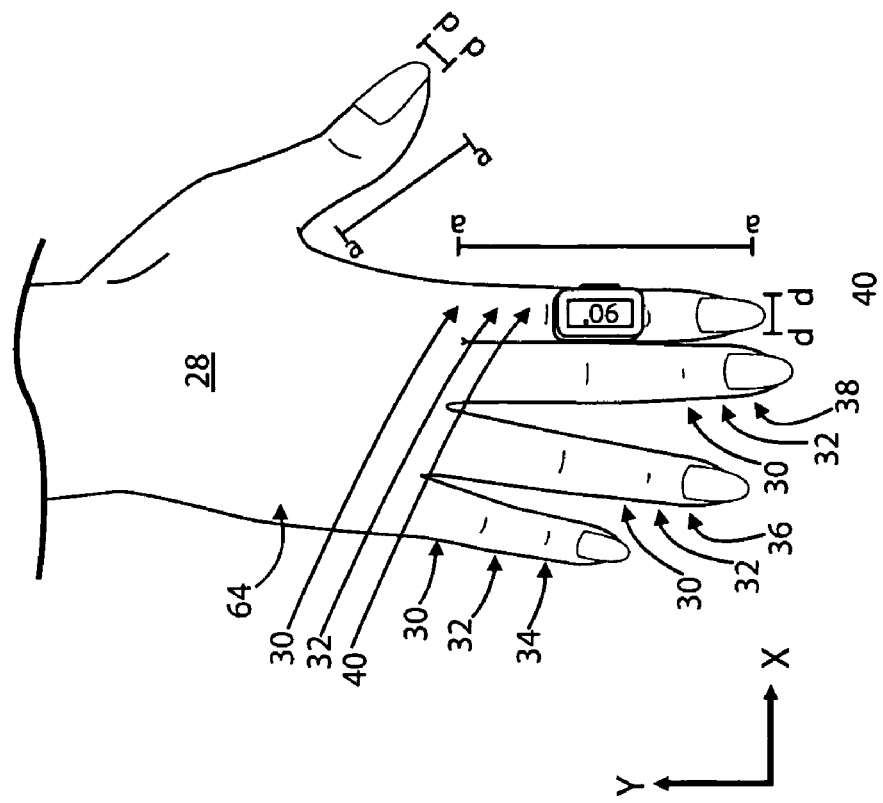
FIG. 3 is a view of back side of a hand with a digit level device.
Figure 4:
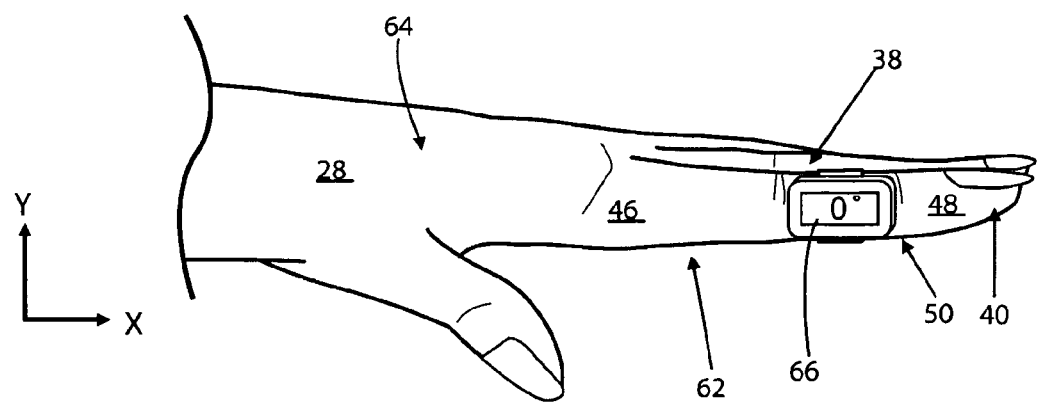
FIG. 4 is a view of the side of a hand with a digit level device.
Figure 5:
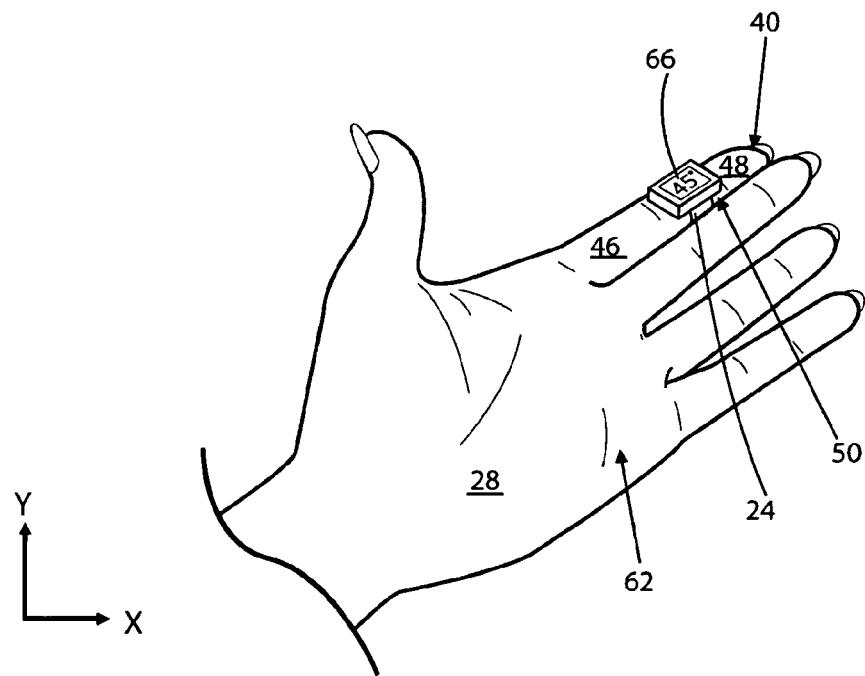
FIG. 5 is a view of a tilted palm side of a hand with a digit level device.
Figure 6:
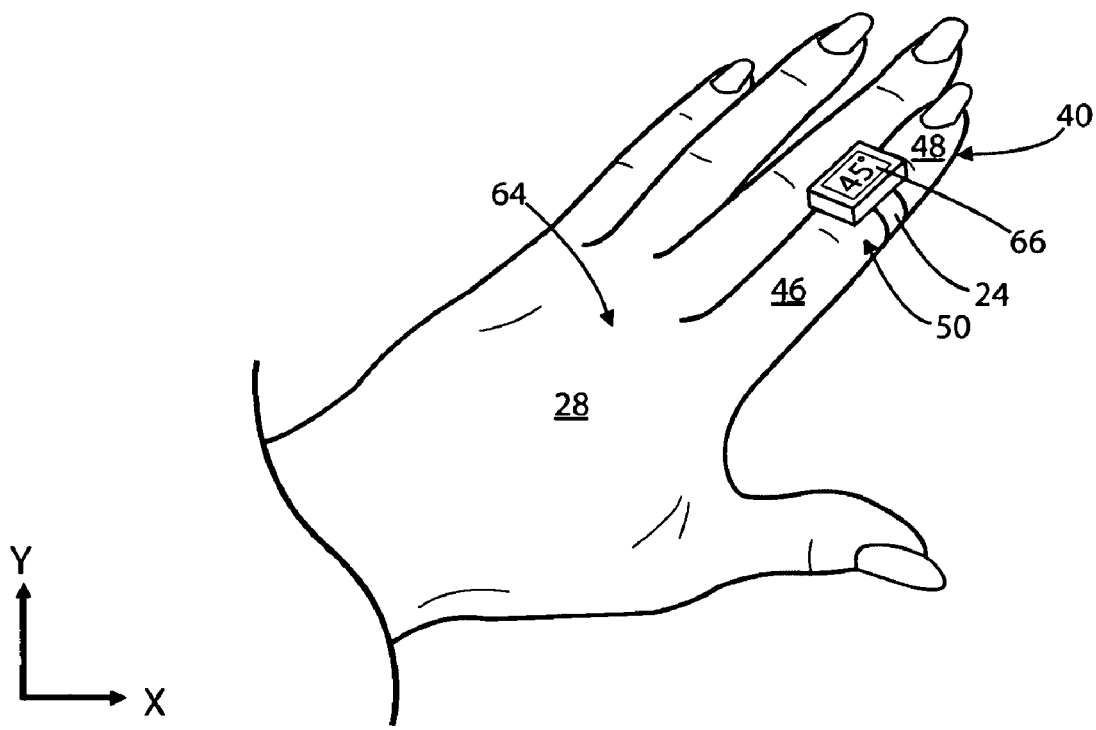
FIG. 6 is a view of a tilted palm side of a hand with a digit level device.

Referring now to FIGS. 2-6, a hand 28 is shown, whereby the length of the fingers 32 generally are shown at angles including parallel to a horizontal plane, as illustrated in FIG. 4, 45 degrees to a horizontal plane or vertical plane, as illustrated in FIGS. 5 and 6, and 90 degrees from a horizontal plane, which is also parallel to a vertical plane, which is illustrated in FIGS. 2 and 3. As seen in FIGS. 5 and 6, it is to be noted that the palm side 62 of the hand 28 can tilted to different angles, and the length of the fingers 32 and length of the thumb 42 can still be referenced in their relative relation to horizontal and vertical. While these FIGS. illustrate digits 30 that are zero, 45 and 90 degree angles from horizontal, it is to be understood that these angles are exemplary only, and it is to be understood that all relative horizontal and vertical angles are intended to be included.

Reference is now made to FIGS. 1B-12. At least one level 22 of any kind currently known in the art or to be discovered can be attachable with any part of the digits 30, and can be facing in any direction around the general circumference of each digit 30, provided that the at least one level is attached and/or calibrated such that the relative horizontal and vertical orientation of the digit 30 is measurable by the level 22, provided that the level 22 is not so large or heavy that it cannot be supported by a digit 30, and provided that the Bulls-eye Exclusion does not apply. Levels 22 commonly known in the art include the digital level 66, laser level 68, spirit level 142, tubular spirit level 70 and bulls-eye spirit level 72. While these FIGS. illustrate digit levels 20 that are located mostly on the middle phalanx section 50 of the index finger 40 and the ring finger 38, and proximal phalanx section 46 of the index finger 40, it is to be understood that this location is exemplary only and that it is intended that the at least one level 22 can be attachable with any of the proximal phalanx section 46, middle phalanx section 50, distal phalanx section 48, proximal phalanx joint 52, PIP joint 54, DIP joint 56 and/or the metacarpalphalangeal joint 58 of any of the digits 30, provided the Bulls-eye Exclusion does not apply. However, for some uses, such as but not limited to cutting hair 44, attaching spirit levels 142 and digital levels 66 on the middle phalanx section 50 of the index finger 40, and attaching a laser levels 68 on the proximal phalanx section 46 of the index finger 40 can be preferable, as described further herein, due to cutting techniques commonly used and currently known in the art, whereby the user will hold hair 44 to be cut between the index 40 and middle finger 38, and will cut the hair 44 parallel with the distal phalanx section 48 and middle phalanx section 50 of the extended index finger 40. In some embodiments, when the device 20 is used for purposes that include touching moisture, such as but not limited to cutting hair, at least the exterior surfaces and/or portions of the device can be waterproof.

At least one level 22 may be attachable with at least one digit 30 in any manner known or to be discovered in the art as long as the at least one level 22 is oriented and/or calibrated to ascertain the general vertical and horizontal orientation of the length of the digit, and unless the Bulls-eye Exclusion applies. Without intending to be limiting, the at least one level 22 can be attachable directly to the at least one digit 30 with a digit attacher 24 that is at least one substance including but not limited to glue and adhesive. Further, the at least one level 22 can be attachable with at least one digit with a digit attacher 24 currently known or to be discovered, which can include, but is not limited to, anything that will go around the finger such as ring or band 74 (unless the Bull-eye Exclusion applies), clip, sleeve 76 and/or glove.

Figure 10:
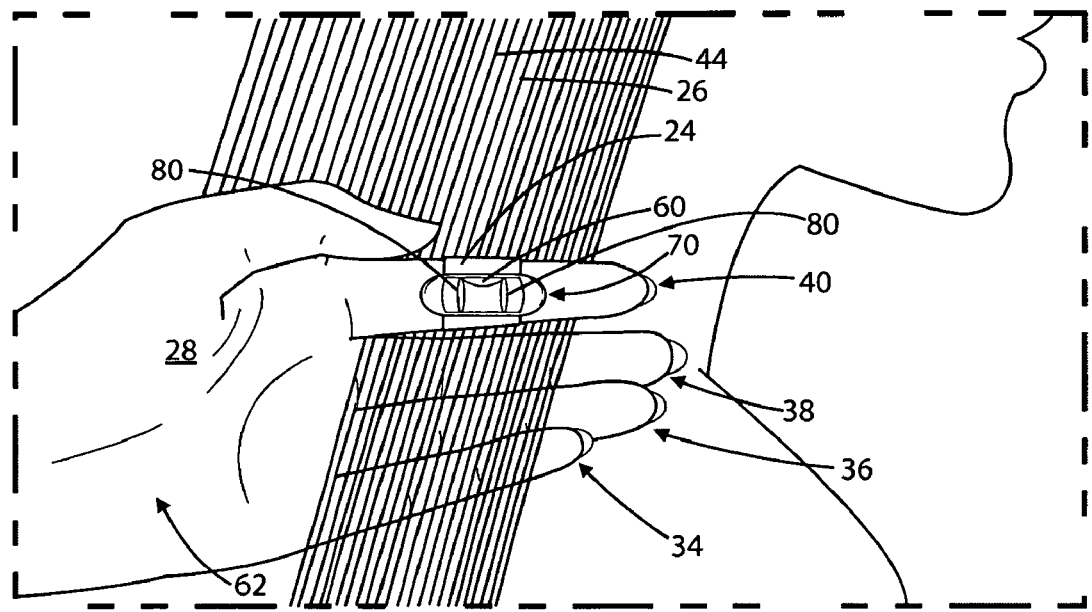
FIG. 10 is a view of palm side of a hand with a digit level device.
Figure 11:
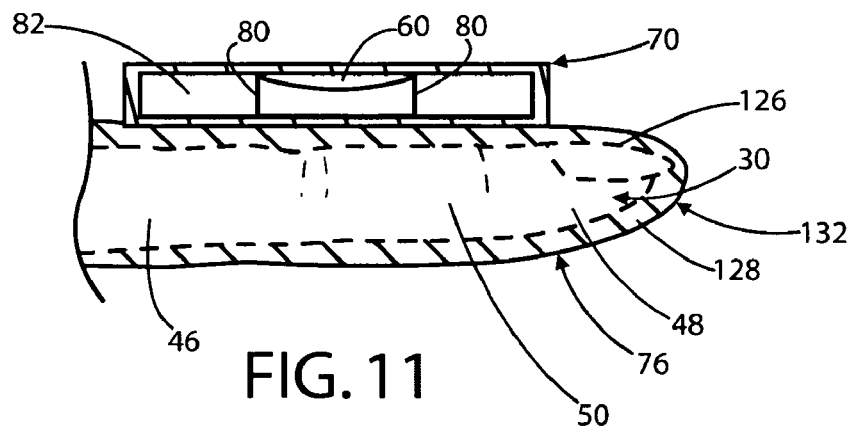
FIG. 11 is a view of a digit with a digit level device that includes a digit sleeve.
Figure 12:
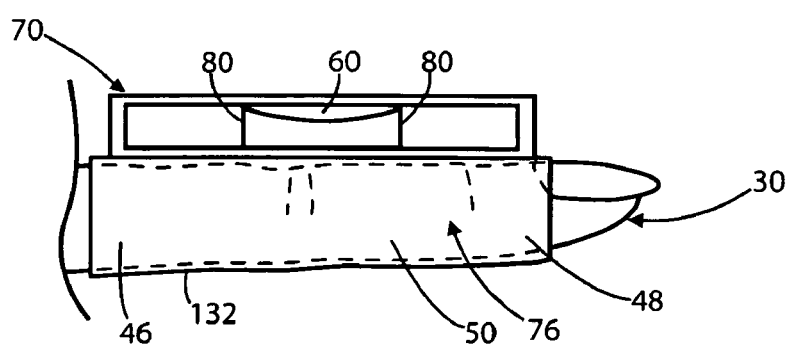
FIG. 12 is a view of a digit with a digit level device that includes a digit sleeve.

Specifically referring now to FIGS. 1A, 1B, 7, 10, and 13-15B, by way of example, and not intending to be limiting, a spirit level that is a tubular spirit level 70, or any spirit level 142 that has a length b-b that is longer than it is wide c-c, can be attachable with any of the proximal phalanx section 46, middle phalanx section 50, distal phalanx section 48, proximal phalanx joint 52, PIP joint 54, DIP joint 56 and/or the metacarpalphalangeal joint 58 of any of the digits 30, whereby the length of the level b-b is generally parallel with the length of the digit a-a. In addition, as illustrated in FIGS. 11 and 12 by way of example and without intending to be limiting, a longer tubular spirit level 70 could be attachable with a digit 30 whereby the length of the level extends at least partially over more than one phalanx section and/or all of the phalanx section of a digit 30. It is to be noted that, as illustrated in FIGS. 7 and 10-12, and as well known in the art, the tubular spirit level includes a bubble 60 in a generally tube-shaped enclosure 78 that is filled with a liquid 82. The tube generally has two guidelines 80, between which the bubble 60 will center on the top of the tube 78, as noted, when the tube 78 is horizontal. As well known in the art, when the tube 78 is vertical, the bubble 60 will float to the highest end of the tube 78. In addition, when the tube is at an angle between horizontal and vertical, the bubble 60 will float between the middle of the tube 78 and the highest end of the tube 78. As known in the art, the tube 78 can be made of a variety of materials, including but not limited to glass or acrylic. In addition, the material of which the tube is made can be clear or a transparent color through with the bubble 60 may be viewed. In addition, the liquid 82 in the tube may be clear or colored.

Referring now to FIGS. 1A, 1B, 15A and 15B, embodiments of the invention are shown whereby a tubular spirit level 70 is attachable with a circular band 74. It is to be noted that the tubular spirit level 70 can be removably or fixedly attachable with the band 74, by ways currently known in the art including, but not limited to, by gluing, welding, molding and clipping. In these embodiments, there is no space between the spirit level and the band 74, which is beneficial when the device 20 is used for purposes where the matter 26 in conjunction with the level could get caught in between the band 74 and the level, such as, but not including when the device 20 is used for cutting hair 44. In other embodiments, the level could be attachable with the band 74 in a manner whereby there is at least a partial space between the level and the band 74. As further illustrated in FIGS. 1A and 1B, the digit side 110 of the band 74 can have at least one ridge 86, and this illustration exemplarily illustrates a series of ridges 86. While embodiments of the band 74, level and level encasement 84 can be made of a variety of materials, which is described in further detail herein, the embodiments illustrated in FIGS. 1A and 1B include a gold encasement 84 for the tubular spirit level 70, and the exterior 108 of the band 74 is made from nickel silver. In addition to the materials described in more detail later herein, and without intending to be limiting, embodiments of the digit level illustrated in FIGS. 1A and 1B also can include a brass, which can be polished, encasement 84 for the spirit level, and the exterior 108 of the band 74 is made from stainless steel, which can be polished.

Specifically referring now to FIGS. 2-6 and 8, by way of example, and without intending to be limiting, at least one digital level 66 can be attachable with any of the proximal phalanx section 46, middle phalanx section 50, distal phalanx section 48, proximal phalanx joint 52, PIP joint 54, DIP joint 56 and/or the metacarpalphalangeal joint 58 of any of the digits 30, whereby the at least one digital level is calibrated to ascertain the relative horizontal and vertical orientation of the portion of the digit 30 to which it is attached in the direction of the length of the digit. In addition, a longer digital level 66 could be attached with a digit in a manner whereby it extends at least partially over more than one phalanx section and/or all of the phalanx sections of a digit 30 and whereby the digital level 66 is calibrated to ascertain the relative vertical and horizontal orientation of the length the more than one phalanx section and/or all of the phalanx sections of a digit 30 to which it is attached. It is to be noted, as known in the art, that the digital level 66 will give a reading that will give the angle of variance from a specific reference. For example, and without intending to be limiting, if horizontal is calibrated as 0 degrees, then a 45 degree angle can be noted as 45 degrees and vertical can be noted as 90 degrees. Some embodiments of the digital level 66 can be battery operated and/or rechargeable. In addition, some embodiments of the digital level 66 can be waterproof, which would be especially beneficial for uses that often include moisture, such as but not limited to, cutting hair 44.

Figure 9:
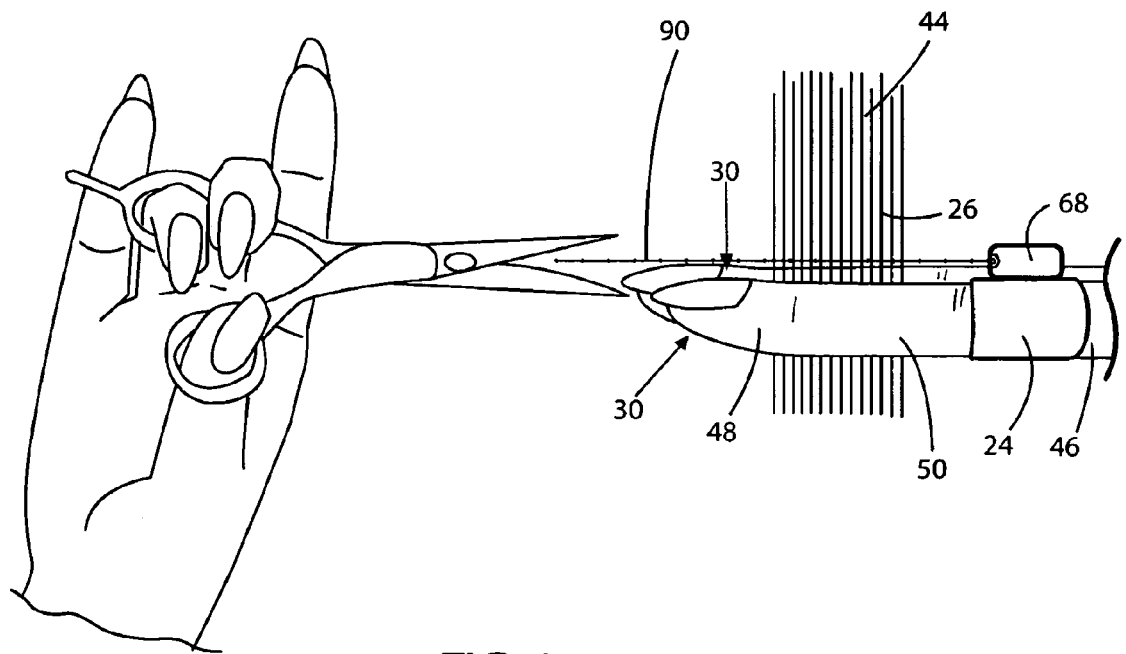
FIG. 9 is a view of the side of two digits with a digit level device and a hand showing the direction of cutting.
Figure 13:
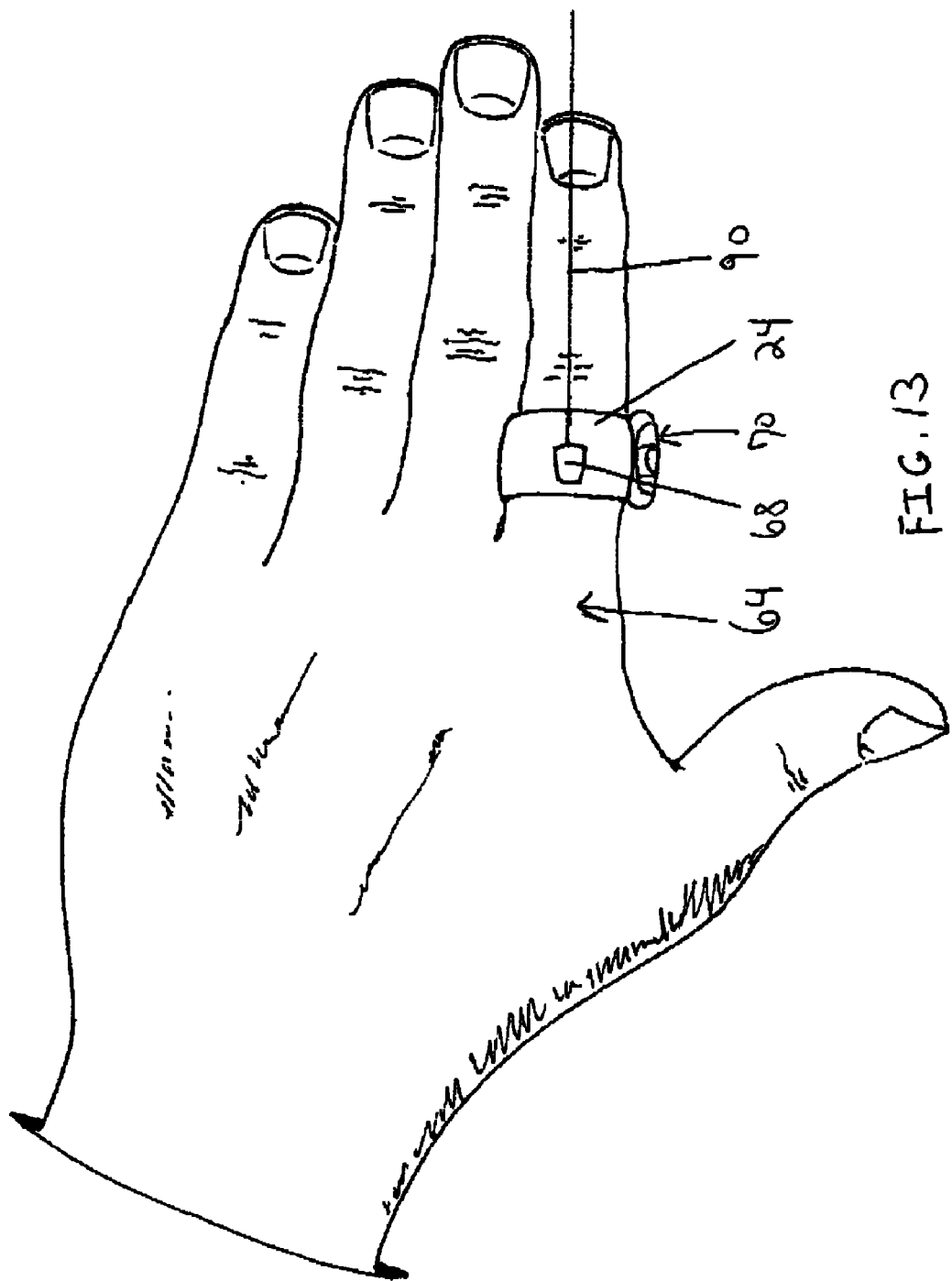
FIG. 13 is a view of back side of a hand with a digit level device.
Figure 14:
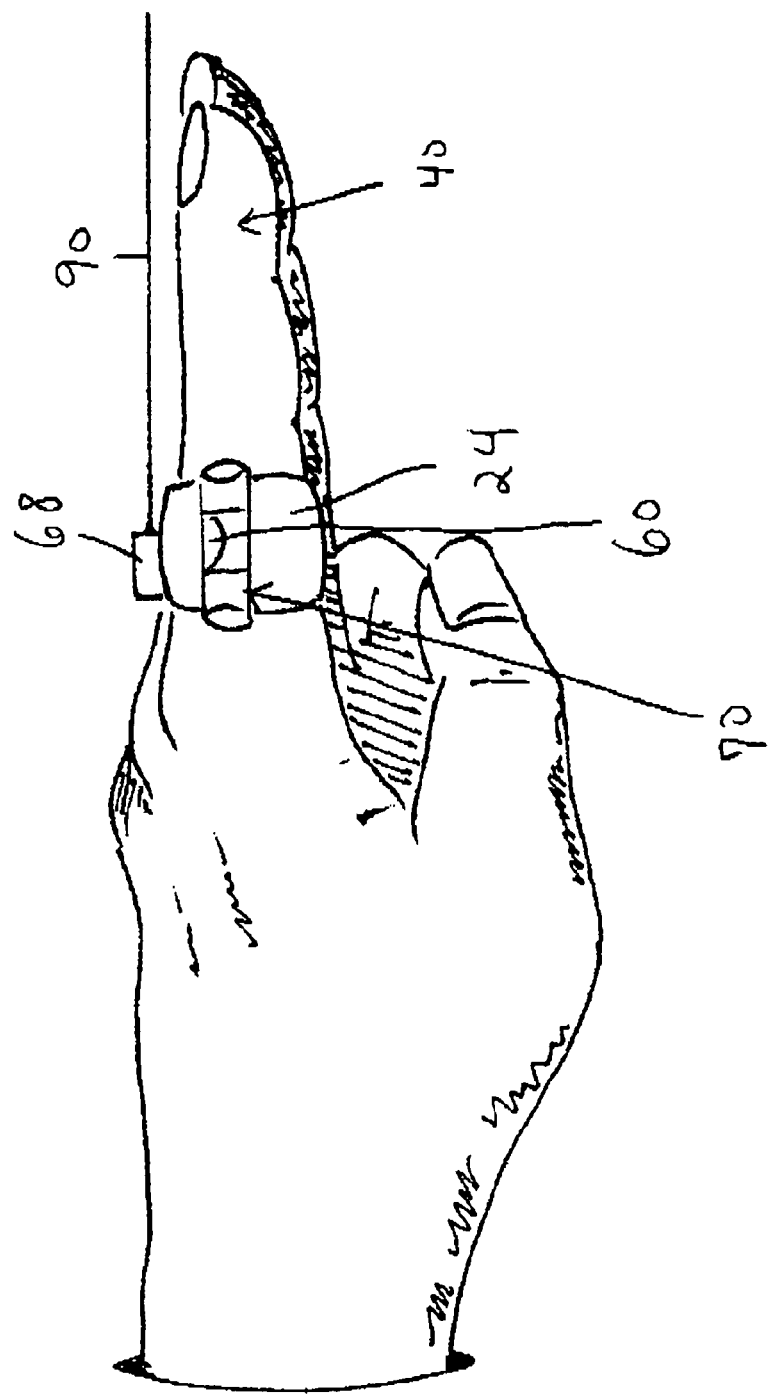
FIG. 14 is a view of the side of a hand with a digit level device.
Figure 16A:
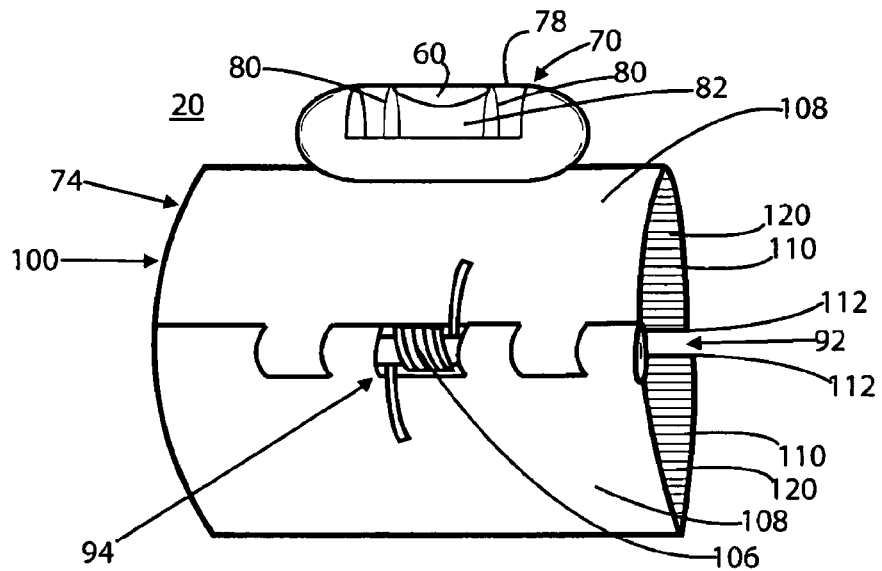
FIGS. 16A-16D are views of a digit level device assembled and disassembled.
Figure 16B:
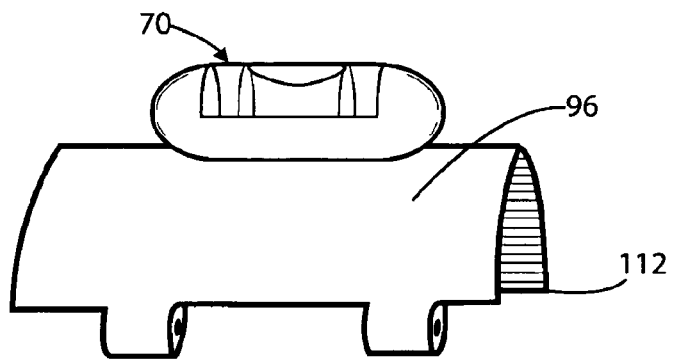
Figure 16D:
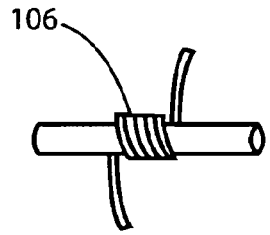
Figure 16C:
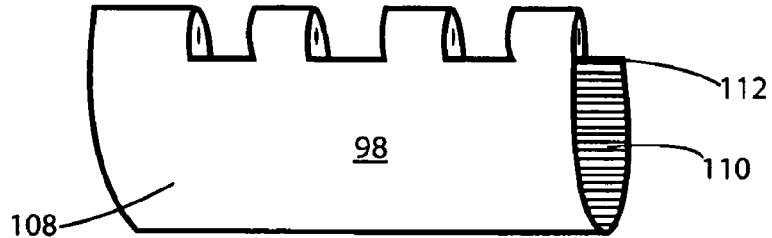

Specifically referring now to FIGS. 9, 13 and 14, by way of example, and without intending to be limiting, at least one laser level 68 can be attachable with any of the proximal phalanx section 46, middle phalanx section 50, distal phalanx section 48, proximal phalanx joint 52, PIP joint 54, DIP joint 56 and/or the metacarpalphalangeal joint 58 of any of the digits 30, whereby the laser beam 90 is projected in direction of the length of the digit 30, and when the digit 30 is extended, the laser beam 90 is generally parallel with the length of the digit 30. In addition, the at least one laser level 68 could be attachable with a digit 30 whereby the projected laser beam 90 is directed to extend along the length of at least partially more than one phalanx section and/or all of the phalanx sections of a digit 30. Some embodiments of the laser level 68 can be battery operated and/or rechargeable. In addition, some embodiments of the laser level 68 can be waterproof, which would be especially beneficial for uses that often include moisture, such as, but not limited to, cutting hair 44.

Figure 17A:
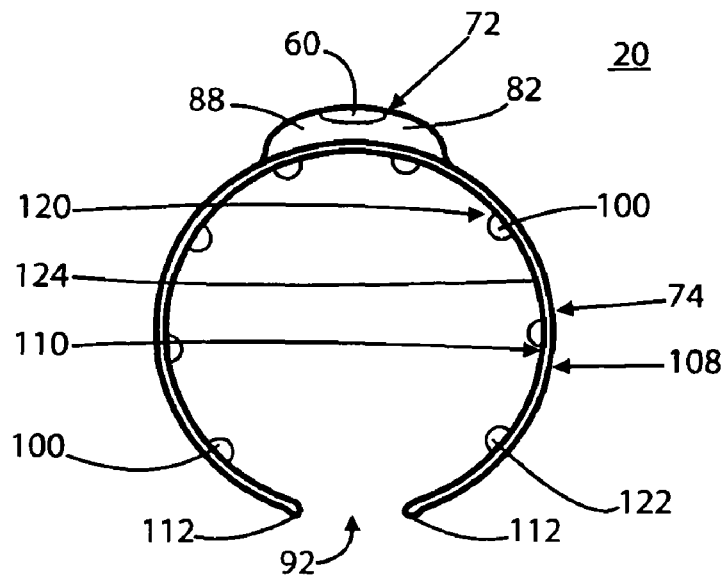
FIG. 17A is an end view of a digit level device.
Figure 17B:
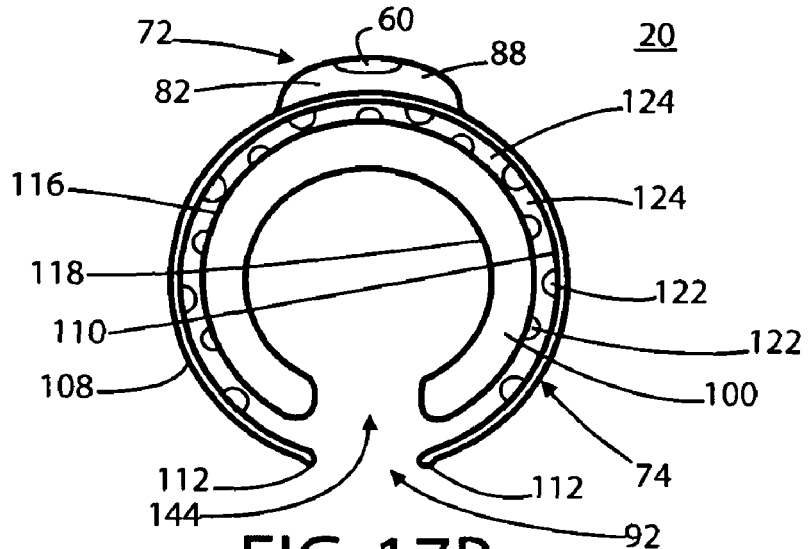
FIG. 17B is an end view of the digit level device of 17A with an insert inserted.
Figure 17C:
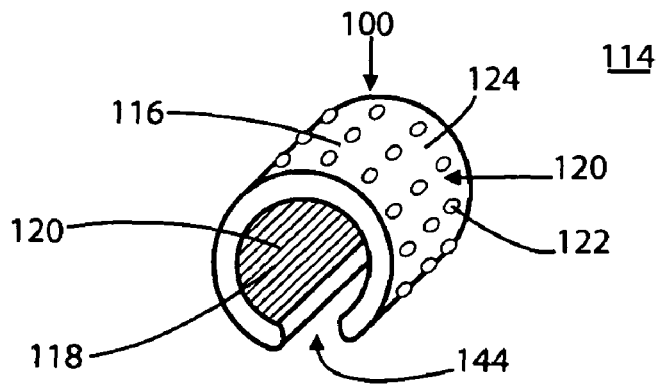
FIG. 17C is a perspective view of the insert of FIG. 17C shown removed from the digit level device.

Referring now to FIGS. 17A and 17B, by way of example, and without intending to be limiting, at least one bulls-eye spirit level 72 can be attachable with any of the proximal phalanx section 46, middle phalanx section 50, distal phalanx section 48, proximal phalanx joint 52, PIP joint 54, DIP joint 56 and/or the metacarpalphalangeal joint 58 of any of the digits 30, whereby the at least one bulls-eye spirit level device 20 is configured to ascertain the relative horizontal and vertical orientation of the portion of the digit 30 to which it is attached in the direction of the length of the digit, provided the Bulls-eye Exclusion does not apply. In addition, a longer bulls-eye spirit level 72 could be attached with a digit in a manner whereby it extends at least partially over more than one phalanx section and/or all of the phalanx sections of a digit and whereby the bulls-eye spirit level 72 device is configured to ascertain the relative vertical and horizontal orientation of the length the more than one phalanx section and/or all of the phalanx sections of a digit 30 to which it is attached, and provided the Bulls-eye Exclusion does not apply. As known in the art, the bulls-eye spirit level 72 contains a bubble 60 in a circular environment 88 that contains a bulls-eye (not shown) and the bubble 60 will be in the bulls-eye when the circular environment is horizontal from front to back and from side to side.

Referring now to FIGS. 13 and 14, more than one level 22 can be attachable with at least one digit 30 or with at least one digit attacher 24. As exemplarily illustrated in these FIGS., and without intending to be limiting, a tubular spirit level 70 and a laser level 68 are both attachable with one digit attacher 24, which in this illustration, for exemplary purposes only an without intending to be limiting, is a band 74. It is to be understood that a tubular spirit level 70 and a laser level 68 could both be attachable at the same time to other types of digit attachers 24 currently known in the art or to be discovered.

Attaching a laser level 68 and at the same time attaching another type of level to a digit 30 and/or a digit attacher 24 can be useful in a variety of circumstances, including, but not limited to, when the user is viewing the levels from the side of the digit, and aligning matter 26 to the length of the digit from the top of the digit or the palm side of the digit. In these circumstances, the spirit level and/or the digital level can indicate the angle of the length of the digit, and the laser level can project a laser beam 90 in a manner that is parallel to the length of the top or the bottom of the extended digit. This can be useful in a number of ways including, but not limited to, when the user wants to align matter 26, such as but not limited to hair 44 or fabric, along to the back side 46 or palm side 62 of an extended digit 30, which is generally straight, to cut the hair 44 or fabric or pin the fabric.

It is to be understood, a digit level device 20 could have more than one level 22 of any differing kind, or of the same kind attachable to the same digit attacher 24 at the same time.

Reference is now made to FIGS. 1A-10, and 13-17B, whereby the digit attacher 24 is at least one band 74, and the at least one level 22 is attachable with at least one digit 30 with the at least one band 74. It is to be noted that, other than the Bulls-eye Exclusion parameters, the at least one level 22 can be removably or fixedly attachable with the at least one band 74, by ways currently known in the art including, but not limited to, by gluing, welding, molding and clipping. In some embodiments, there is no space between the at least one level 22 and the at least one band 74, which is beneficial when the device 20 is used for purposes where the matter 26 in conjunction with the level 22 could get caught in between the band 74 and the level 22, such as, but not limited to, when the device 20 is used for cutting hair 44. In other embodiments, the at least one level 22 could be attachable with the at least one band 74 in a manner whereby there is at least a partial space between the level and the band 74. In some embodiments, the at least one level could be contiguous with the at least one band 74.

The band 74 and/or the exterior 108 of the band 74 can be made of a variety of materials, including but not limited to, plastic, mesh, stainless steel, metal, gold, brass, rubber, fabric, nickel steel, plastic blend including but not limited to Plexiglas and acrylic, and other blends. It is to be noted that the materials will have varying degrees of firmness. In addition, embodiments of the band 74 will be waterproof, which can be helpful when the digit level is being used for a purpose that includes moisture, such as but not limited to for cutting hair 44. Further, as illustrated in FIGS. 15A and 15B, is some embodiments, the encasement 84 for the level 22 can be made when the band 74 is molded around the level 22.

The at least one band 74 can be configured such that it will fit the desired section of the desired digit 30 of the intended user. In some embodiments a digit level 20 designed to be used for a specific purpose, such as but not limited to a digital 66 or spirit level 142 for cutting hair 44, can be configured such that it will snugly fit the middle phalanx section 50 of the index finger 40, and in some embodiments a laser digit level 68 designed to be used for a specific purpose, such as but not limited to a laser level for cutting hair 44, can be configured such that it will snugly fit the proximal phalanx section 46 of the index finger 40.

The at least one band 74 could be of various widths, provided it is wide enough to hold the level 22, and not so wide that it extends beyond the digit, unless it is a digit sleeve 76, which is explained in more detail later herein.

The at least one band 74 alone or in conjunction with the level 22 could be continuous. In these embodiments, the band 74 could be of various sizes and/or could be made of an expandable material, such as but not limited to rubber and/or elastic, to enable the band 74 to fit digits 30 of various sizes, and/or portions of digits 30 of various sizes.

In some embodiments, as illustrated in FIG. 1A, 15A, 15B, 17A, and 17B by way of example and without intending to be limiting, the at least one band 74 can have a gap 92, which could expand when used with larger digits 30 and/or portions of digits 30, and thereby adding flexibility in the size of the at least one band 74. The expandable ability of band 74 will increase with more flexible materials such as, but not limited to, plastics and rubber. The gape ends 112 of the band 74 where the gap 92 starts can be rounded or otherwise softened to minimize the chance that the user's digit will be pinched if the gap ends 112 of the band 74 are compressed on the user's digit 30.

Referring now to FIGS. 16A-16D, the digit attacher 24 can be a band 74 that can have a spring hinge 94, such as, but not limited to the example illustrated, to enable the band 74 to be flexible to fit more than on sized digit 30 or different locations and sections on one digit that are of different sizes. As illustrated in these FIGS., this example of the embodiment can have a band 74 with a first section 96, a second section 98 and a spring hinge 94 in between. At least one level will be attached to the at least one of the first section 96 or second section 98. Both the first section 96 and the second section 98 have a spring side 102 and a gap side 104. The spring 106 pushes against the exterior 108 of the first section 96 and second section 98 at the spring side 102, which has the effect of pushing the gap sides 104 of the first section 96 and the second section 98 together. The size of the gap 92 between the first section 96 and the second section 98 on the gap side 104, and whether there is a gap 92 on the gap side 104 when worn by the user, depends on factors, including but not limited to, the size of the digit 30 inside the assembled band 74 and the amount of pressure exerted by the spring 106. The pressure exerted by the spring 106 can have the benefit of providing pressure on the band 74 when it is on the digit 30 while at the same time enabling flexible sizing. Providing pressure on the band 74 while it is on the digit 30 can have the benefit of keeping the band 74 from rotating around the digit 30, which in turn will keep the level on the band 74 in place on the digit. This can be beneficial to the user who is using the hand 28 while at the same time viewing the level 22 on the digit to determine or confirm the angle of the length of the digit. Also, when the digit level 20 is used for some purposes, such as but not limited to cutting hair 44, the matter 26 being held by the digit 30, such as the hair 44, might contain moisture, which can cause the band 74 and/or the digit 30 to become damp or wet, and the added pressure from the spring hinge 94 on the band 74 can prevent or restrict the rotation of the band 74 on the digit that is due to the moisture. In addition, the digit side 110 of the first section 96 and/or the second section 98 can also have a grip enhancer 100, which is described in more detail later herein. It is to be noted that the ends 112 of the band 74 where the gap 92 starts can be rounded or otherwise softened to minimize the chance that the user's digit will be pinched if the gap 92 ends 112 of the band 74 are compressed on the user's digit.

Reference is now made to FIGS. 1A, 1B, and 15A-17C, which illustrate embodiments of at least one grip enhancer 100 on a digit attacher 24. An at least one band 74 has an inner surface, which is referred to herein as the digit side 110, which is the surface of the at least one band 74 that touches the digit 30 when it is worn by the user, or the surface of the band 74 that interacts with the band side 116 of the at least one band insert 114, to be described in more detail later herein, if a band insert 114 is used.

Reference is now made to FIGS. 15B, 15C, 17B and 17C, which are embodiments of band liners and/or inserts 114. The term "insert 114" is used, however, it is understood that the term is intended to include liners too. This may be made of a variety of materials, including but not limited to, foam, closed cell foam, plastic, thermoplastic elastomer, gel 128, metal, rubber-like padding, rubber, cloth and fabric. As seen in these FIGS., the insert 114 will have a band side 116 and a digit side 118. The band side 116 faces the band 74 and the digit side 118 faces the digit 30 when in use. The band side 116 will have a shape that is compatible with the digit side 110 shape of the band 74, so that the insert 114 will attachable with the band 74. The insert 114 could be removably or fixedly attachable with the band 74. If the insert 114 is fixedly attachable with the band 74, it could be attached in ways currently known in the art or to be discovered, including but not limited to, heating, gluing, molding and taping. In additionally, if the insert 114 is removably attachable, it could be attachable by ways including but not limited to, friction, tape, hook and loop material, and interlocking parts.

Referring now to FIGS. 1A, 1B, 15A, 16A, and 17A-17C, the digit side 110 of the band 74, the band side 116 of the insert 114 and/or the digit side 118 of the insert 114 could have an uneven surface 120 to enhance the grip of the band 74 and/or the insert 114 with each other and/or with the digit. As illustrated in FIGS. 1A, 1B, 15A and 16A, by way of example and without intending to be limiting, the digit side 110 of the band 74 can have at least one ridge 86 and are illustrated with a series of ridges 86.

In some embodiments the digit side 110 of the band 74, the band side 116 of the insert 114 and/or the digit side 118 of the insert 114 could have at least one bump 122, ridge 86, dimple and/or other uneven surfaces 120 known in the art or to be discovered to enhance grip of the band 74 and insert 114 with each other or with at least one digit 30. In some embodiments, the digit side 110 of the band 74, the band side 116 of the insert 114 and/or the digit side 118 of the insert 114 will have at least one bump 122 or a series of bumps 122 and/or ridges 86 to enhance grip. It is to be understood that other ways of enhancing grip currently known in the art or to be discovered to enhance grip are intended also to be included within the scope of other embodiments of grip enhancers 100 on the digit side 110 of the band 74, the band 116 side of the insert 114 and/or the digit side 118 of the insert 114. When the grip enhancement is added to the digit side 110 of the band 74 or the insert 114, the grip enhancement can increase the grip of the band 74 on the digit 30 or the portion of the digit on which the user wears the band 74. In addition, when an insert 114 is used with the band 74, the grip enhancer 100 on the digit side 110 of the band 74 can enhance the attachment of the insert 114 with the band 74. Similarly, when an insert 114 is used with the band 74, the grip enhancer 100 on the band 116 side of the insert 114 can enhance the attachment of the insert 114 with the band 74. In some embodiments, the grip enhancers 100 on the band 116 side of the insert 114 and the digit side 110 of the band 74 can be complimentary, and or/generally interlocking, such as but not limited to, a series of bumps 122 and complimentary spaces 124, as exemplarily illustrated in FIGS. 17A-17C, at least one protruding bump 122 and at least one similarly-shaped and slightly larger indentation, and/or at least one protruding ridge 86 and at least one similarly-shaped and slightly larger indented ridge 86.

Other grip enhancements 100 that could be used on the digit side 110 of a band 74 and/or the digit side 118 of an insert 114 can include, but are not limited to, a soft and/or pliable material such as, but not limited to, foam, gel 128, cloth, rubber-like padding and rubber. Soft and/or pliable materials can have the added benefit of providing comfort to the user due to the soft and/or pliable feel of the band 74 and/or insert 114 against the digit of the user. In addition, substances currently known in the art or to be discovered that add gripping qualities can be sprayed or painted onto the band 74 or the insert 114.

The grip enhancements 100 on the digit side 110 of the band 74 when an insert 114 is not used or on the digit side 118 of an insert 114 when the insert 114 is used can have a variety benefits to the user, including, but not limited to, keeping the band 74 on the portion of the digit on which the user wants the level 22, keeping the band 74 from rotating around the digit 30 after the user places it on the digit with the level 22 facing in the direction desired by the user, and for comfort. For devices 20 that are used for purposes that include moisture, such as cutting hair 44, the grip enhancements also can be useful for keeping the band 74 from moving when the moisture contacts the digit and/or the band 74.

Reference is now made to FIGS. 11 and 12, whereby the finger attachment portion is a digit sleeve 76 and at least one level 22 is attachable with at least one digit 30 with the digit sleeve 76. It is to be noted that the level 22 can be removably or fixedly attachable with the sleeve 76, by ways currently known in the art including, but not limited to, by gluing, welding, molding, weaving, sewing, hook and loop material, such as but not limited to Velcro, and clipping.

In some embodiments, there is no space between the level 22 and the sleeve 76, which is beneficial when the device 20 is used for purposes where the matter 26 in conjunction with the level 22 could get caught in between the sleeve 76 and the level 22, such as, but not limited to, when the device 20 is used for cutting hair 44. In other embodiments, the level 22 could be attachable with the sleeve 76 in a manner whereby there is at least a partial space between the level 22 and the sleeve 76.

The sleeve 76 can be of various lengths, provided it is long enough to hold the level 22, and not so long that it extends beyond the digit 30 by more than about one inch. In addition, the end of the sleeve toward the distal phalanx section 48, or the tip of the digit, can be either closed or open. Some embodiments of the sleeve 76 can include a sleeve 76 that covers some of the digit, most of the digit, all of the digit, and/or extends beyond the digit. In some embodiments when the sleeve 76 includes a stiff material, a sleeve 76 that covers most of the digit, all of the digit, and/or extends beyond the digit can have the added benefit of keeping the digit extended in a straight manner.

In some embodiments, the sleeve 76 can be attachable with the digit 30 by friction, such as if the sleeve 76 is sufficiently snug with the digit when worn by the user. In some embodiments, the sleeve 76 can also be at least partially made of a pliable material, such as but not limited to, elastic, rubber and spandex, such that it could expand around the digit to create a snug fit. In some embodiments, at least a portion of the interior 126 of the sleeve 76 that contacts the digit 30 when it is worn by the user could be made of a pliable material such as but not limited to, gel 128, foam, and/or rubber, that could mold to the digit 30 and create a snug fit. Further in some embodiments, the sleeve 76 could be tightened around the digit 30 once it is attached with the digit by ways currently known in the art or to be discovered, including but not limited to, by hook and loop material, ties, buttons, hook and eye, clips, and/or clamps. In addition, in some embodiments the sleeve 76 could be made of variety of materials, including but not limited to, plastic, mesh, stainless steel, metal, gold, brass, rubber, fabric, nickel steel, plastic blend including but not limited to Plexiglas and acrylic, and other blends. Some embodiments of the sleeve 76 can be made of waterproof material.

In addition, in manner similar to the manner described in relation to at least one band 74, the sleeve 76 could have a sleeve insert. This may be made of a variety of materials, including but not limited to, foam, plastic, gel 128, metal, rubber padding, and fabric. The insert will have a sleeve 76 side and a digit side 110. The sleeve side faces the sleeve 76 and the digit side faces the digit 30 when in use. The sleeve side will have a shape that is compatible with the digit side shape of the interior of the sleeve 76, so that the insert will be attachable with the sleeve 76. The insert could be removably or fixedly attachable with the sleeve 76. If the insert is fixedly attachable with the sleeve 76, it could be attached in ways currently known in the art or to be discovered, including but not limited to, heating, gluing, molding and taping. In additionally, if the insert is removably attachable, it could be attachable by ways including, but not limited to, friction, tape, hook and loop material and interlocking parts.

In addition the digit side of the sleeve 76, the sleeve side of the insert and/or the digit side of the insert could have an uneven surface 120 to enhance the grip of the sleeve 76 and/or the insert. Without intending to be limiting, the digit side of the sleeve 76 can have at least one or a series of ridges 86, bumps 122 and or dimples.

In some embodiments the digit side of the sleeve 76, the sleeve side of the insert and/or the digit side of the insert could have at least one bump 122, ridge 86, dimples and/or other uneven surfaces 120 known in the art to enhance grip. In some embodiments, the digit side of the sleeve 76, the sleeve side of the insert and/or the digit side of the insert will have a series of bumps 122, dimples and/or ridges 86 to enhance grip. It is to be understood that other ways of enhancing grip currently known in the art to enhance grip are intended also to be included in the scope of grip enhancers 100 that can be used on other embodiments of the digit side of the sleeve 76, the sleeve side of the insert and/or the digit side of the insert. When the grip enhancement is added to the digit side of the sleeve 76 or the digit side of the insert, the grip enhancement can increase the grip of the sleeve 76 on the digit 30 or the portion of the digit on which the user wears the sleeve 76. In addition, when an insert is used with the sleeve 76, the grip enhancer 100 on the digit side of the sleeve 76 can enhance the attachment of the insert with the sleeve 76. Similarly, when an insert is used with the sleeve 76, the grip enhancer 100 on the sleeve side of the insert can enhance the attachment of the insert with the sleeve 76.

In some embodiments, the enhancers on the sleeve side of the insert and the digit side of the sleeve 76 can be complimentary, and or/generally interlocking, such as but not limited to, at least one or a series of bumps 122 and complimentary spaces 124 on both the digit side of the sleeve 76 and the sleeve side of the insert, at least one protruding bump 122 and at least one similarly-shaped and slightly larger indentation, and/or at least one protruding ridge 86 and at least one similarly-shaped and slightly larger indented ridge 86.

In addition, a digit sleeve 76 can have and insert and/or other grip enhancements that could be used on the digit side of the sleeve 76 and/or the digit side of an insert, which can include but are not limited to a soft and/or pliable material and other materials such as, but not limited to cloth, rubber, foam, closed cell foam, plastic, thermoplastic elastomer, gel 128, metal, rubber-like padding, and fabric. Soft and/or pliable materials can have the added benefit of providing comfort to the user due to the soft and/or pliable feel of the sleeve 76 and/or insert against the digit of the user. In addition, substances currently known in the art or to be discovered that add gripping qualities can be sprayed or painted onto the sleeve 76 or the insert.

In addition to utilizing an individual sleeve 76, in a similar manner as the individual sleeve 76, a level can be attachable with at least one finger or thumb section on a glove. In these embodiments, at least one level can be either fixedly or removably attachable with at least one finger or thumb section of a glove.

Reference is now made to FIGS. 7-10 and 18A-18F. These FIGS. illustrate the use of a digit level for the purpose of cutting hair 44. The term stylist and user are used interchangeably herein to describe the user because stylists often cut hair 44. However, it is to be understood that the scope of the invention is intended to include all users in addition to stylists. As commonly known in the art, a stylist will pull a section of hair 44 between the index finger 40 and the ring finger 38, and while so holding the section of hair 44, will make a cut of the hair 44 section along the extended distal phalanx 48 and the middle phalanx sections 50. Generally, the stylist will try to avoid making the cut along the proximal phalanx section 46, as it is generally slightly wider than the middle phalanx section 50 and the distal phalanx section 48, and the likelihood of the stylist also cutting part of the stylist's finger increases.

Often the cut will be made in a straight horizontal manner, and the level 22 can confirm that the extended middle phalanx 50 and the distal phalanx 48 sections are straight and level, and therefore the cut, using the middle phalanx section 50 and the distal phalanx section 48 as a guide, also will be level and straight. However, in some circumstances, the stylist might also want to cut the hair 44 at a consistent angle, anywhere between and including horizontal and vertical, and the digit levels 20 of the current invention can be helpful to achieve this purpose. It is to be understood, however, that some levels 22 might be preferable to others for use in determining a horizontal angle and/or an angle between horizontal and vertical or vertical. The size and accuracy of the levels may impact accuracy. Generally, the more accurate the level, the more accurate the information on which the stylist will rely. In addition, particularly relating to a spirit level 142, the larger the size, the more easily the stylist would be able to determine the movement of the bubble 60 inside. To determine an angle other than horizontal, the digital level 66 in many instances would be preferable to provide the most accurate information, as a digital level 66 would be able to readily tell the stylist the exact angle of the level on the digit 30.

In some embodiments, as illustrated in FIGS. 7, 8, 10 and 18A-18F, when the stylist is using a spirit level 142 or a digital level 66, the stylist will locate the level 22 at the middle phalanx section 50 of the digit closest to the eyes of the stylist in a manner whereby the level 22 is facing the stylist when the cut is being made. In this manner, the stylist can confirm the angle at the middle phalanx section 50 and the distal phalanx section 48, where the cut is made, at the time that the cut is made. In some embodiments, the hair 44 will be place between the index finger 40 and middle finger 38 with the index finger 40 being closest to the stylist when the cut is made.

As illustrated in FIG. 9, in some embodiments, when a laser level 68 is used, it will be located at the proximal phalanx section 46, with the laser beam 90 projecting over the middle phalanx section 50 and the distal phalanx section 48 where the cut will be made. As known in the art, due to the width of the scissors, and the stylist's action to avoid cutting his or her fingers 32, when the cut is made, the cut will be slightly higher than the top or bottom of the middle phalanx section 50 and the distal phalanx section 48 of the digits, which often are the index finger 40 and middle finger 38, which the stylist is using as a guide. Without intending to be limiting, often in the art, the hair 44 is cut about one quarter of an inch above or below the at least one digit 30 that the stylist is using as a guide. Preferably, the laser level 68 will be attached to the proximal phalanx section 46 in a manner whereby when the laser beam 90 is projected over the middle phalanx section 50 and the distal phalanx section 48 of the straightened digit 30 being used as a guide, which is often index finger 40, at the time of the cut, the laser beam 90 will be at the level that is slightly higher that the digit 30 at which the cut is actually made. If the beam 90 is not projected at the level of the actual cut, and it is higher or lower, the stylist can use the projected beam 90 as a guide to following in a parallel manner when making the cut.

Figure 8:
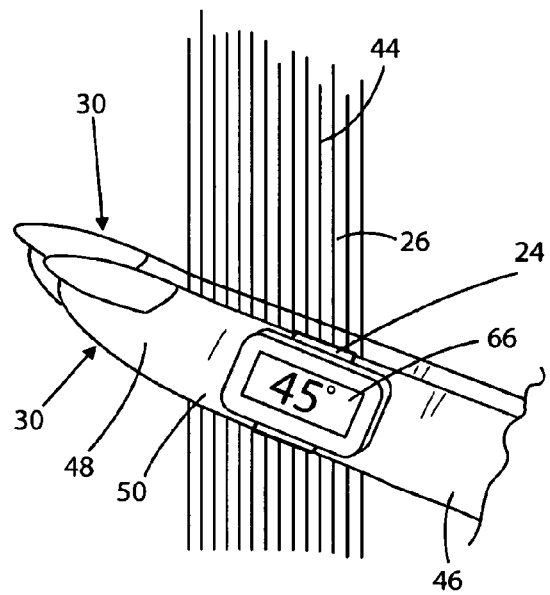
FIG. 8 is a view of the side of two digits with a digit level device.
Figure 18A:
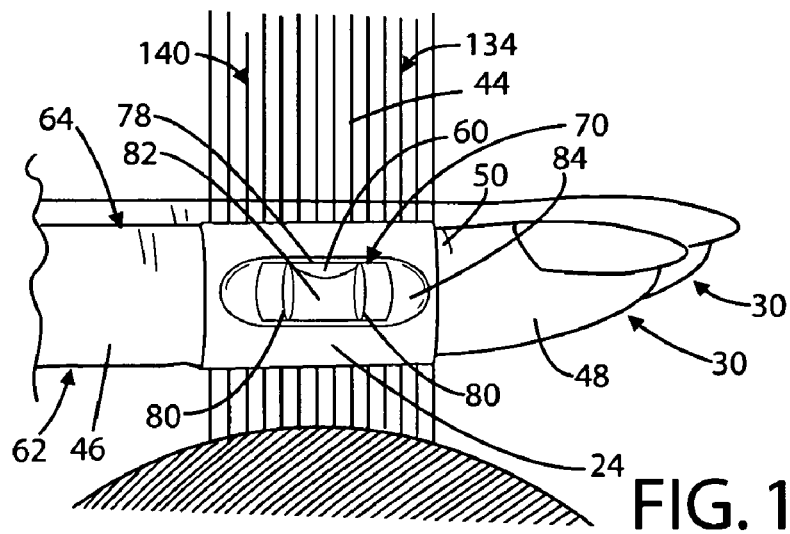
FIGS. 18A-18F are views of a method for cutting hair using a digit level device.

Referring now to FIGS. 18A-18F, a commonly used cutting technique is exemplarily illustrated that utilizes a digit level 20. In these illustrations, a tubular digit level 70 is used, however, it is to be understood that any type of level 22 that is currently known or to be discovered that is not too large or heavy to be supported by a digit is intended to be included within the scope of the method of the invention. As illustrated in FIG. 18A, a section 134 of hair 44 that has not yet been cut 140 is isolated and placed between two digits 30. In this illustration, the hair 44 is placed between the index finger 40 and the middle finger 38, which is a common technique in the art. However, it is to be understood that it is intended to fall within the scope of this method for the user to place the section 134 of hair 44 between any combination of digits 30 as well. As illustrated in FIG. 18A, one of the digits 30 in the proximity of the hair section 134 has a level attached to in whereby the level measures the relative horizontal and vertical orientation of the length of the digit 30. Preferably, the level will be attached to one of the digits 30 holding the hair 44, and more preferably attached to the digit holding the hair 44 that is closest to the eye of the user. In addition, as illustrated, preferably, a spirit level or digital level will be facing the eye of the user, so that it may be easily read. If the level is a laser level, preferably the laser level will be on the side of the finger on which the cut is being made so that the cut may be aligned in a parallel manner with the laser beam 90, as illustrated in FIG. 9. As further exemplarily illustrated in FIG. 18A, the fingers 32 between which the hair 44 section is placed will be aligned in the angle at which the cut will be made. The angle will be ascertain and/or confirmed by use of the digit level 30. In these illustrations the angle is zero degrees from horizontal, however, it is to be understood that the invention includes all other angles between horizontal and vertical. Without intending to be limiting, FIG. 8, illustrates a 45 degree angle. Use of the digit level 20 can ensure that a consistent angle is being cut into the hair 44. Also without intending to be limiting, a 90 degree angle from horizontal, which is a vertical orientation, could be used for cuts including, but not limited to, a Mohawk style on the back of the head.

Figure 7:
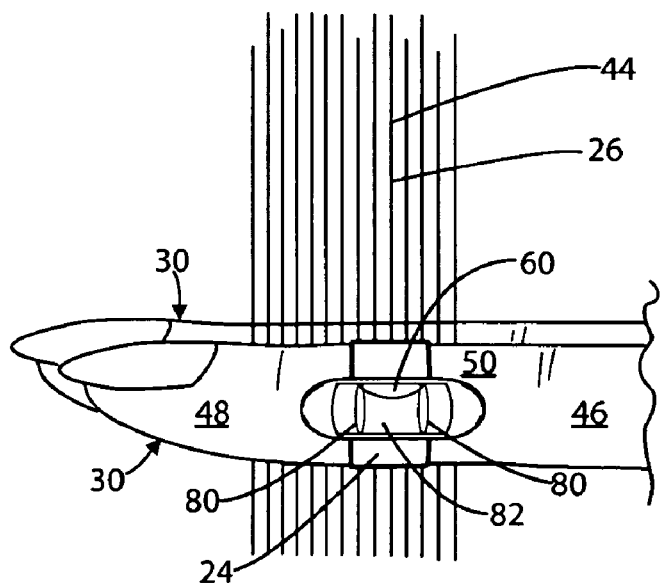
FIG. 7 is a view of the side of two digits with a digit level device.
Figure 18B:
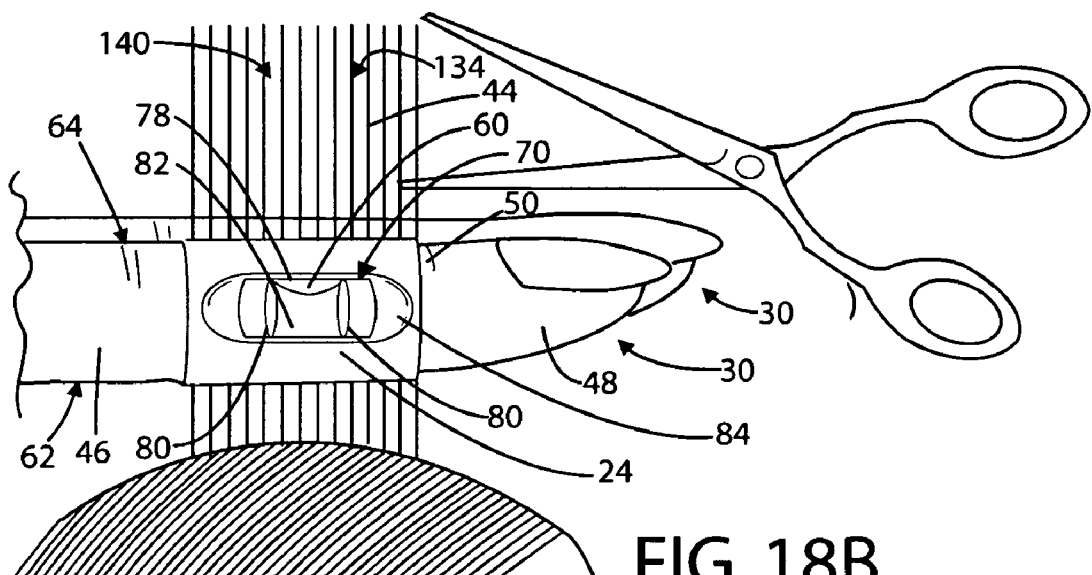
Figure 18C:
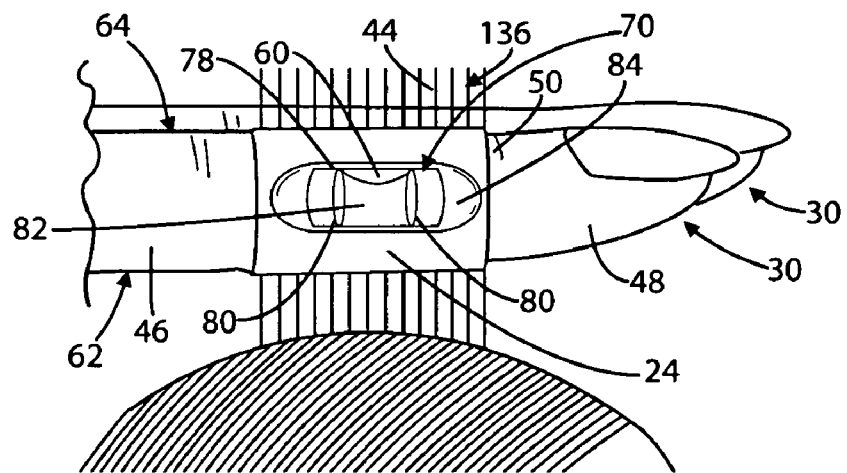

Referring now to FIGS. 18B and 18C, the hair 44 is cut aligned with the fingers 32 between which the hair 44 section is located. Since the fingers 32 are aligned with the desired angle as determined and/or confirmed by the digit level, the cut hair 136 will be at the desired angle. Generally in the art, a stylist will cut hair 44 along the distal phalanx section and then middle phalanx section of the index finger 40 and middle, and will try to avoid making the cut along the proximal phalanx sections of the index finger 40 and middle finger 38, as they are generally slightly wider than the middle phalanx and the distal phalanx sections, and the likelihood of the stylist also cutting part of the stylist's finger increases. While these illustrations show the user cutting the hair 44 on the back side 64 of the fingers 32, it is intended that the user could also cut at the palm side 62 of the digits 30. FIG. 10 illustrates a user aligning the hair 44 between two fingers 32 with the level on the palm side 62 of the hand 28. The user could cut the hair 44 that as illustrated below the index finger 40 in this illustration whereby the angle of the length of the finger can be followed as determined and/or confirmed by the digit level. In addition, in another embodiment, the fingers 32 as illustrated in FIG. 10 could be rotated so that the palm side 62 is facing downward, and the level could be rotated and/or affixed so that it would be facing the user, as exemplarily illustrated in FIGS. 4, 7 and 8, whereby a user could align the hair 44 and cut below the palm in alignment with the length of the fingers 32. It is to be noted that FIGS. 4, 7 and 8 illustrate the hair 44 before cutting. This embodiment of the method can easily be used with long hair 44.

Figure 18D:
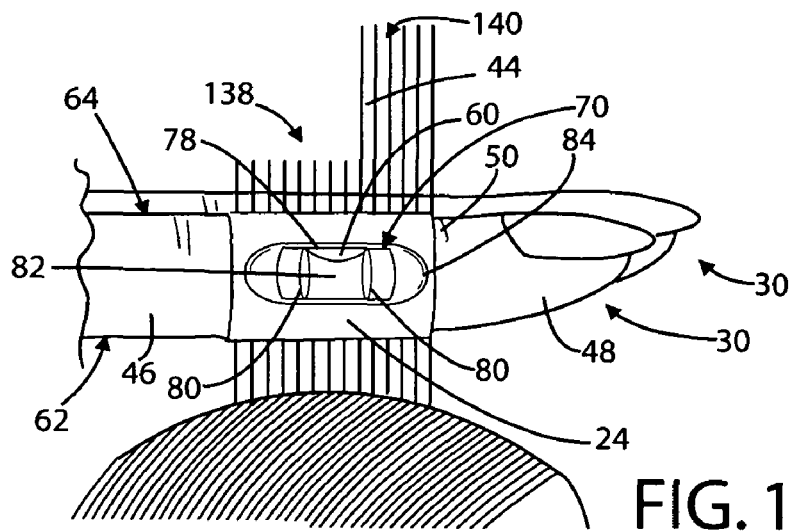
Figure 18E:
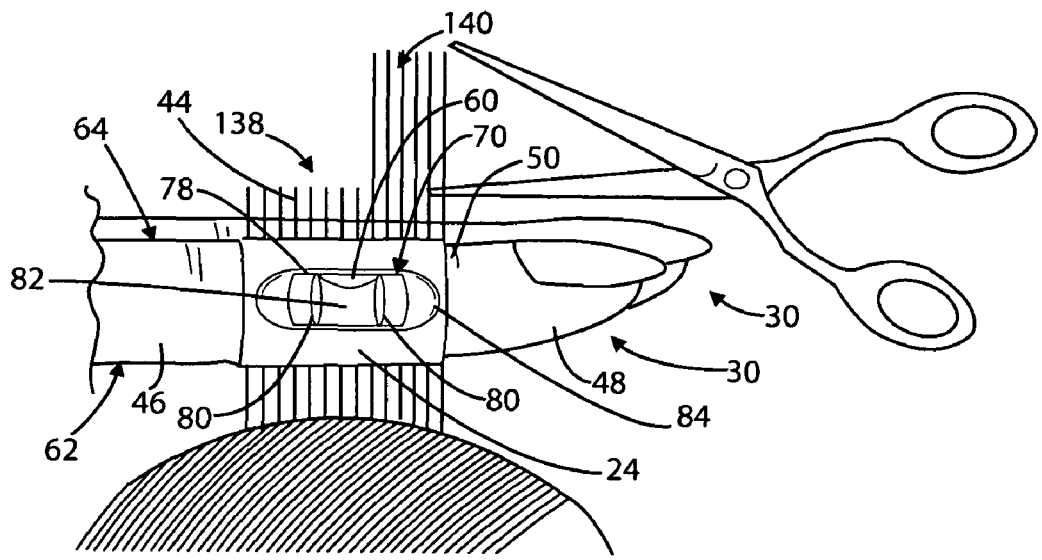
Figure 18F:
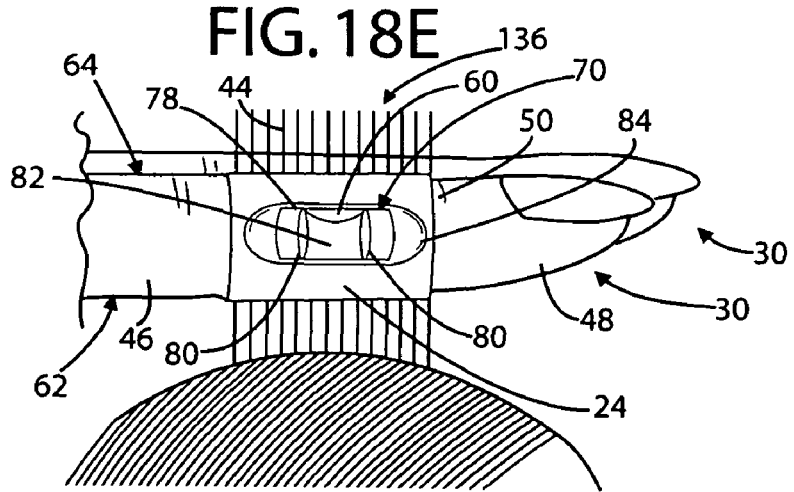

An embodiment of the method also includes using the level in conjunction with at least a portion of a previously cut section of hair 44 to cut subsequent uncut sections at the same angle. Referring now to FIG. 18D, the user pulls at least a portion of the previously cut hair 138 along with a portion of hair that has not yet been cut 140, holds them between two digits 30, and aligns and/or confirms the angle with the digit level 20. Thereafter, as exemplarily illustrated in FIGS. 18E and 18F, the new section is cut at the same angle as the previously cut portion, so that the new section of cut hair 136 is cut at the same angle as the previously cut hair 138. In addition, as exemplarily illustrated, the new section can also be cut at the same length as the previously cut portion.

Although the invention has been illustrated by reference to specific embodiments, it will be apparent to those of ordinary skill in the art that various changes and modifications may be made which clearly fall within the scope of the invention. The invention is intended to be protected broadly within the spirit and scope of the appended claims.

I claim:

1. A digit level device, said device being comprised of a spirit level, said spirit level having a length that is longer than it is wide, said digit level device further comprising a digit attacher, said digit attacher being attachable with at least one digit of a user, said level being oriented with said digit attacher such that when said digit attacher is attached with said at least one digit of a user, the length of said spirit level is generally parallel with the length of said at least one digit.

2. The device of claim 1, said device being made of waterproof exterior materials.

3. The device of claim 1, wherein said digit attacher is generally cylindrical.

4. The device of claim 3, said cylindrical digit attacher having a gap.

5. The device of claim 1, said digit attacher having a digit side, said digit side having an uneven surface.

6. The device of claim 5, said uneven surface having at least one ridge.

7. The device of claim 5, said uneven surface having at least one bump.

8. A digit level device, said leveling device comprising a level, said level being configured to be attachable with at least one of the distal phalanx section or the middle phalanx section of at least one digit of the user.

9. A method for cutting hair, said method comprising:
providing a digit level device;
attaching said digit level device to at least one digit of a user;
utilizing said leveling device while cutting hair to determine the angle of the cut.

10. The method of claim 9, said method further comprising determining the angle of the cut in relation to the horizontal and vertical plane.

11. The method of claim 10, said method further comprising cutting the hair in alignment with said at least one digit to which said leveling device is attached.

12. The device of claim 4, said device further comprising a level encasement, said level encasement having an exterior surface, at least said exterior surface of said encasement being comprised of stainless steel, said attacher further comprising an exterior surface, at least said exterior surface of said attacher further being comprised of stainless steel; said attacher having a digit side, at least a portion of said digit side comprising an uneven surface, said uneven surface comprising more than one ridge; and said device further being comprised of waterproof exterior materials.

13. The device of claim 8, wherein said level is a digital level.

14. The device of claim 8, wherein said level is a laser level.

15. The device of claim 8, wherein said level is a tubular spirit level.

16. The device of claim 8, wherein said level is a bulls eye spirit level.

17. The device of claim 8, wherein said device comprises at least one spirit level and at least one laser level.

18. The device of claim 8, wherein said further comprises an attacher, and wherein said attacher further comprises a hinge.

19. The device of claim 8, wherein said further comprises an attacher, and wherein said attacher further comprises a grip enhancer.

20. The device of claim 8, wherein said further comprises an attacher, and wherein said attacher further comprises a digit sleeve.

* * * * *